Patented Aug. 19, 1924.

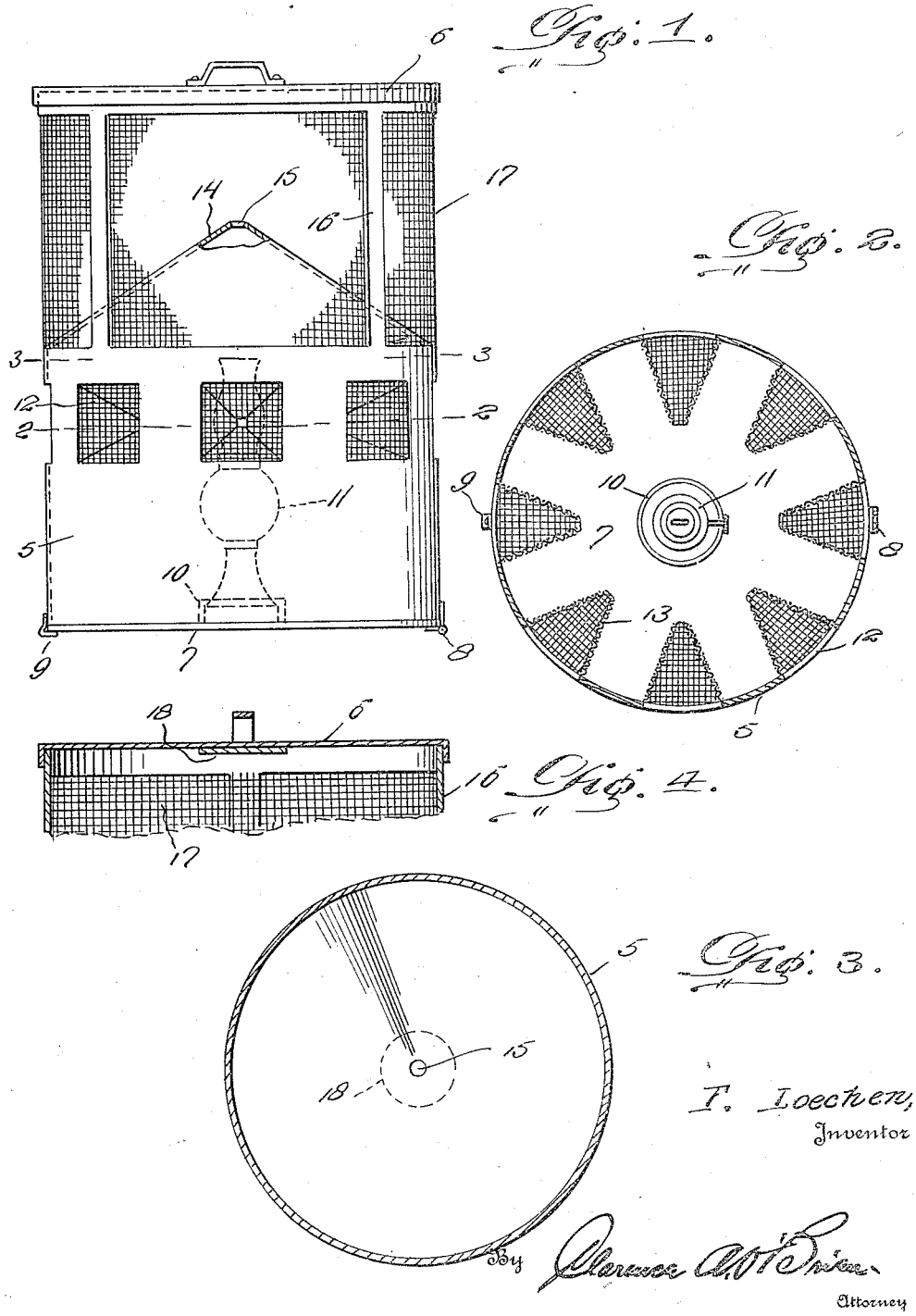

1,505,651

UNITED STATES PATENT OFFICE.

FRED LOESCHEN, OF ESTHERVILLE, IOWA.

INSECT TRAP.

Application filed December 10, 1923. Serial No. 679,701.

*To all whom it may concern:*

Be it known that I, FRED LOESCHEN, citizen of the United States, residing at Estherville, in the county of Emmet and State of Iowa, have invented certain new and useful Improvements in Insect Traps, of which the following is a specification.

This invention relates to certain new and useful improvements in insect traps, and has particular reference to traps of that type employing a light as a medium for attracting the insects.

The primary object of the invention is to generally simplify and improve insect traps of the above character, whereby the same may meet with all of the requirements for a successful commercial use.

A further object of the invention is to provide an insect trap of the above kind, which may be cheaply and easily manufactured and placed in use, which is of such construction as to enable the same to be readily cleaned and kept in operation, and which embodies features of construction, whereby the flies are effectively attracted to a light compartment and from the light compartment into the trap chamber.

Other objects will appear as the nature of the invention is better understood, and the same consists in the novel form, combination, and arrangement of parts, hereinafter more fully described, shown in the accompanying drawings and claimed.

In the drawings, wherein like reference characters indicate corresponding parts throughout the several views:

Figure 1 is a side elevational view, partly broken away and in section, of an insect trap constructed in accordance with the present invention.

Figure 2 is a horizontal sectional view, taken substantially upon the line 2—2 of Figure 1.

Figure 3 is a view similar to Figure 2, taken upon the line 3—3 of Figure 1, and Figure 4 is a fragmentary vertical sectional view showing details of the upper portion of the trap.

Referring more in detail to the drawings, the present invention comprises an upright open ended casing 5 preferably constructed of sheet metal in cylindrical form as shown and provided with a removable closure cap or cover 6 upon the upper end thereof, the bottom of the casing being closed by means of a hinged bottom member 7 pivoted as at 8 to swing downwardly for opening the same, and having means as at 9 for releasably maintaining the same closed. Rigid with and upon the upper surface of the central portion of the bottom 7 is a socket member or retaining flange 10 for the base of a lamp 11, preferably of the liquid fuel type.

The intermediate portion of the casing 5 is provided with a circular series of relatively small entrance openings as at 12 through which the insects may find their way into the light chamber of the casing 5, and in order to permit re-entrance of the insect while at the same time preventing exit thereof through the opening 12, radial inwardly extending entrance funnels 13, preferably of screened material, are secured to the inner surface of the casing 5 over the openings 12.

The interior of the casing 5 is divided into a lower light chamber and an upper trap chamber by means of a substantially central conical partition 14 that has a relatively small central opening 15 in the upper smaller end thereof directly above the lamp 11, and through which the insects may readily pass through the light chamber upwardly into the trap chamber, while being prevented from readily passing back from the trap chamber to the light chamber.

The upper portion of the casing or substantially the upper half thereof is provided with a plurality of relatively large openings as at 16, which are closed by a cylindrical foraminous wall 17, preferably formed of screen material, whereby outward passage of the light for attracting the insects into the trap is insured, considerable light also passing through the openings 12 for this purpose.

Secured centrally to the cover 6 and against the under surface thereof is a highly polished light reflecting plate 18, disposed directly above the opening 15 of the partition.

In operation, the lamp 11 is lighted, and the cover 6 placed upon the top of the casing after the bottom 7 has been latched in closed position. The light shining from the lamp 11 through the openings 12 will attract the insects and they will pass through the openings 12 and funnels 13 into the light chamber. The light from the lamp 11 shining through the opening 15 onto the reflecting plate 18 will attract the insects so that they will ultimately find their way through the opening 15 into the upper trap chamber above the partition 14. By reason of the conical formation of the partition 14 ready passage of the insects into the trap chamber is permitted, while passage of the insects from the trap chamber into the light chamber is rendered highly unlikely. By removing the cover 6, the insects may be collected or destroyed, and by opening the bottom 7, the supply of fuel for the lamp 11 and the flame thereof may be respectively replenished and regulated.

The construction described is extremely simple and durable and will be found efficient in operation.

What I claim as new is:

1. In an insect trap of the character described, an upright casing having a bottom wall provided with central lamp retaining means, said casing being provided with numerous openings through which light may shine from the lamp, inwardly extending funnel shaped entrance members secured over said openings, a centrally apertured conical partition within the casing above the last named openings and the lamp for dividing the casing into an upper trap chamber and a lower light chamber, and a reflecting plate upon the top of the casing directly above said opening in the partition.

2. In an insect trap of the character described, an upright casing having a bottom wall provided with central lamp retaining means, said casing being provided with numerous openings through which light may shine from the lamp, inwardly extending funnel shaped entrance members secured over said openings, a centrally apertured conical partition within the casing above the last named openings and the lamp for dividing the casing into an upper trap chamber and a lower light chamber, a reflecting plate upon the top of the casing directly above said opening of the partition, the bottom of the casing being mounted for opening movement, means for releasably retaining the bottom of the casing closed, said top of the casing comprising a removable cover plate, and the remaining openings of the casing having foraminous plates secured thereover.

In testimony whereof I affix my signature.

FRED LOESCHEN.